_(12)_ United States Patent
Fukuda

(10) Patent No.: US 6,700,608 B1
(45) Date of Patent: Mar. 2, 2004

(54) IMAGE PICKUP APPARATUS

(75) Inventor: Hidetoshi Fukuda, Yokohama (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/219,856

(22) Filed: Dec. 23, 1998

(30) Foreign Application Priority Data

Dec. 25, 1997 (JP) ............................................. 9-366193

(51) Int. Cl.$^7$ ................................................. H04N 9/64
(52) U.S. Cl. ...................................... 348/243; 348/302
(58) Field of Search ................................ 348/241, 243, 348/245, 302, 304, 317; 378/98.8

(56) References Cited

U.S. PATENT DOCUMENTS

| | | | | |
|---|---|---|---|---|
| 5,181,118 A | * | 1/1993 | Kimura | ........................ 348/243 |
| 6,124,888 A | * | 9/2000 | Terada et al. | ................ 348/302 |

FOREIGN PATENT DOCUMENTS

| | | | | |
|---|---|---|---|---|
| JP | 07015666 | 1/1995 | | |
| JP | 09163236 | 6/1997 | | |
| JP | 09163244 | 6/1997 | | |
| JP | 409163236 A | * | 6/1997 | .......... H04N/5/335 |

* cited by examiner

Primary Examiner—Wendy R. Garber
Assistant Examiner—Matthew L Rosendale
(74) Attorney, Agent, or Firm—Westerman, Hattori, Daniels & Adrian, LLP

(57) ABSTRACT

An image pickup apparatus having a function for OB clamping, the image pickup apparatus including an XY addressing type solid-state image pickup device having light receiving pixels and optically shielded OB pixels on the periphery of the light receiving pixels and drive means for driving the solid-state image pickup device in both or one of a thinned-out readout mode for reading out one light receiving pixel out of every given number of pixels and a mode of reading out the light receiving pixels in a given region, wherein OB clamping is effected by always reading out OB pixels at the same location, regardless of the above two signal readout modes or regardless of location and/or number of light receiving pixels to be read out in the above two signal readout modes. A stable OB clamping is thereby effected even when there has been a change in signal readout mode or in location and/or number of pixels to be read out.

8 Claims, 6 Drawing Sheets

THINNED OUT

REGION "A"

REGION "B"

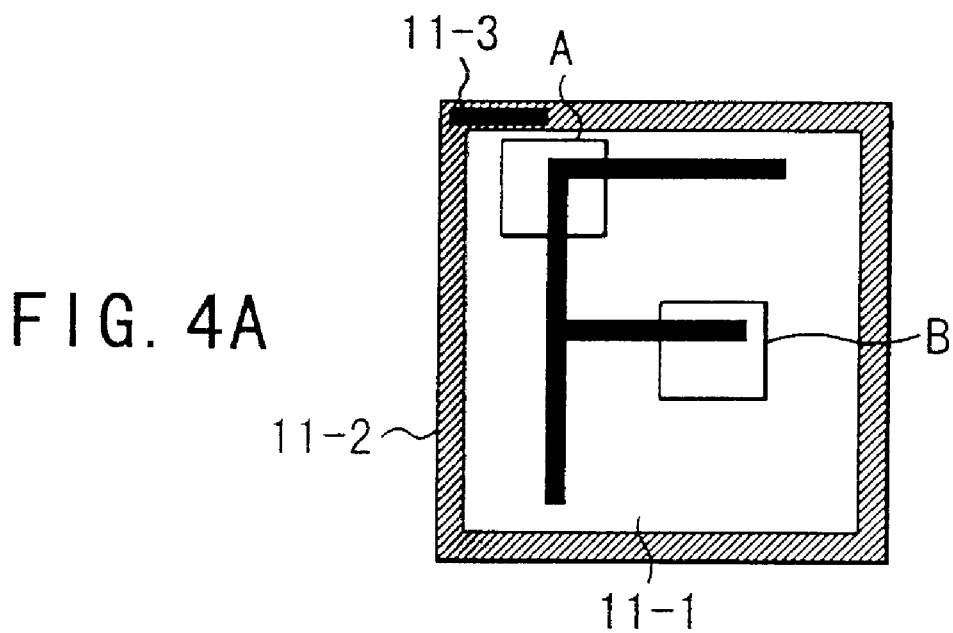
FIG. 4A
FIG. 4B    THINNED OUT
FIG. 4C    REGION "A"
FIG. 4D    REGION "B"

IMAGE PICKUP APPARATUS

BACKGROUND OF THE INVENTION

The present invention relates to image pickup apparatus using an XY addressing type solid-state image pickup device.

Among conventionally known as XY addressing type image pickup device is one constructed as shown in FIG. 1. Referring to FIG. 1: numeral 1 denotes light receiving pixels; 2, optically shielded OB (optical black) pixels disposed on the periphery of the light receiving pixels; and 3, 4, vertical and horizontal scanning circuits, respectively, for scanning and reading out the light receiving pixels 1. Thus constructed XY addressing type solid-state image pickup device is known to be capable of selectively reading out signal of given pixels, i.e., random access, by suitably controlling the driving methods of the horizontal scanning circuit and the vertical scanning circuit.

Further, usually in a solid-state image pickup device, an optically shielded OB pixel is read out in a vertical or horizontal blanking period to perform OB clamping so as to bring its output level to a reference level in order to perform a stable image pickup operation against a change in ambient conditions such as in temperatures.

For example, driving methods are disclosed in Japanese patent application laid open No. 9-163236 of an image pickup apparatus using XY addressing type solid-state image pickup device having optically shielded OB pixels on the periphery of light receiving pixels, which can be driven in a thinned-out readout mode for reading out one light receiving pixel out of every given number of pixels and in a mode of reading out all the pixels, where: (1) OB pixels, too, are thinned out and read out at a low rate in the thinned-out readout mode for reading out one light receiving pixel out of every given number of pixels; (2) OB pixels are read out without being thinned in the thinned-out readout mode for reading out one light receiving pixel out of every given number of pixels; and (3) OB pixels are read out without being thinned out in the mode of reading out all the pixels.

Further, Japanese patent application laid open No. 9163244 discloses an image pickup device having optically shielded OB pixels on the periphery of light receiving pixels and adapted as capable of drive in a mode of reading out light receiving pixels from a given region, where OB pixels on the periphery of the light receiving pixels are read out in horizontal or vertical blanking period to thereby make a stable OB clamping possible even in the mode of reading out the light receiving pixels from a given region. Further, an XY addressing type solid-state image pickup device generally possesses a relatively large FPN (fixed pattern noise) and its suppression is required. Among the methods of suppressing such FPN, one is disclosed for example in Japanese patent application laid open No. 7-15666 where reset is effected after reading out video signals from pixels, and pixel signals read out immediately after such reset are written as FPN into a memory, suppressing FPN by subtracting the pixel signals thus written into the memory from the video signals.

As described above, an XY addressing type solid-state image pickup device is capable of random access by suitably adapting a scanning circuit for selecting pixels from which signals are read out. An image pickup device having horizontal by vertical pixels of H×V=2048×2048=4,200,000, for example, is capable, in addition to a normal full-pixel readout, of reading out only H×V=512×512 pixels by thinning out to ¼ both horizontally and vertically for the entire picture area or of reading out the light receiving pixels from a given pixel region, etc.

Here, a solid-state image pickup device where OB pixel 2-1 disposed as shown in FIG. 2A before light receiving pixels 1 of each line from which signals are read out is read out for OB clamping, when driven in a thinned-out readout mode for the entire picture area, a mode of reading out region "A", and a mode of reading out region "BB" produces a displayed image on a monitor or the like as shown in FIGS. 2B, 2C, 2D, respectively.

In this respect, the manner of operation will now be described of the case where FPN suppressing operation is effected at the same time of OB clamping using OB pixels. The suppression of FPN is performed as follows. In particular, the solid-state image pickup device is driven so that signal immediately after reset is read out for the first one frame. Such signal is stored to a memory as FPN, and, for frames of the next and after, FPN thus stored at the memory is subtracted from video signal to suppress FPN. On the other hand, in view of stability, time constant of OB clamping is usually set to several-hundred ms. Accordingly, for example when a transition is made from the thinned-out readout mode to the mode of reading out region "A", OB clamping during the time period for writing as FPN into the memory the signal immediately after reset in the first frame at such transition, is effected substantially in accordance with the output of OB pixels at the time of performing the thinned-out readout before the transition. It is gradually converged into OB clamping in accordance with the output of OB pixels corresponding to readout of region "A".

For this reason, if shading occurs due to variance in vertical direction of the OB pixels to be read out for OB clamping, an output level of OB pixel to be read out differs from another depending on the location of readout of image in the thinned-out readout mode or in the mode of reading out region "A". A difference thus occurs between DC level during the first one frame period for writing FPN into the memory and DC level after several-hundred ms when OB clamping has been stabilized. Accordingly, data to be written into the memory as FPN possesses an offset. Since FPN data possessing such offset is subtracted from video signal to suppress FPN, there is a problem that video output after FPN suppression, too, contains an error corresponding to the offset.

Moreover, OB clamping is necessary also when all the pixels in one complete shot are read out to take a picture. Since the time constant of an OB clamp circuit is usually several-hundred ms, a stable OB clamping cannot be performed due to the fact that one shot of picture is taken in a short time duration.

SUMMARY OF THE INVENTION

To eliminate the above problems in conventional image pickup apparatus having both OB clamp means and FPN suppression means, it is a main object of the present invention to provide an image pickup apparatus in which stable OB clamping is performed and FPN suppression can be correctly effected even when signal readout mode has been changed or when location and/or number of pixels to be read out have been changed.

In accordance with the present invention, there is provided an image pickup apparatus including: an XY addressing type solid-state image pickup device having light receiving pixels and optically shielded OB pixels on the periphery of the light receiving pixels; and drive means for driving the solid-state image pickup device in signal readout modes of both or one of a thinned-out mode for reading out one light receiving pixel out of every given number of pixels and a mode of reading out the light receiving pixels in a given region; and the apparatus further including means for effecting OB clamping by always reading out OB pixels at the same location, regardless of the two signal readout modes or regardless of location and/or number of light receiving pixels to be read out in the two signal readout modes.

Since OB clamping is effected by thus reading out always the OB pixels at the same location regardless of the two signal readout modes or regardless of location and/or number of light receiving pixels to be read out in the two signal readout modes, a stable OB clamping is effected even when signal readout mode has been changed or when location and/or number of pixels to be read out in each signal readout mode have been changed. The above main object is thereby achieved. Here, in this aspect, if FPN suppression means is provided, FPN suppression can be effected at a high accuracy.

Also, in this aspect, by setting the number of pixels to be read out in the mode for reading out one light receiving pixel out of every given number of pixels as the same as that in the mode of reading out the light receiving pixels in a given region, signal accumulating time is the same in the two modes so that stable images can be obtained as having an equivalent brightness before and after switching between the two modes.

It is another object of the present invention to provide an image pickup apparatus in which stable OB clamping is effected even when signal readout mode has been changed or when location and/or number of pixels to be readout have been changed and stable OB clamping is effected also in readout of all the pixels.

In accordance with the present invention, there is provided an image pickup apparatus including: an XY addressing type solid-state image pickup device having light receiving pixels and optically shielded OB pixels on the periphery of the light receiving pixels; and drive means for driving the solid-state image pickup device, in addition to a mode for reading out all the pixels, in signal readout modes of both or one of a thinned-out readout mode for reading out one light receiving pixel out of every given number of pixels and a mode of reading out the light receiving pixels in a given region; and the apparatus further including means for effecting OB clamping by always reading out OB pixels at the same location and holding an OB clamp reference value at the time of such OB clamping in the mode for reading out one pixel out of every given number of pixels and in the mode of reading out a given region regardless of these two signal readout modes or regardless of location and/or number of light receiving pixels to be read out in the two signal readout modes, and effecting OB clamping in the mode for reading out all the pixels by using the OB clamp reference value having been held in the mode for reading out one pixel out of every given number of pixels and/or the mode of reading out a given region.

By constructing in this manner, stable OB clamping is effected even when signal readout mode has been changed or when location and/or number of light receiving pixels to be read out in each signal readout mode have been changed, and at the same time it becomes possible to effect a stable and secure OB clamping with a reduced time lag even in the mode for reading out all the pixels such as at the time of taking one complete shot of picture, thereby achieving the above object.

Also, in this aspect, by setting the number of pixels to be read out in the mode for reading out one light receiving pixel out of every given number of pixels as the same as that in the mode of reading out the light receiving pixels in a given region, signal accumulating time is the same in the two modes so that stable images can be obtained as having an equivalent brightness before and after switching between the two modes.

BRIEF DESCRIPTION OF THE DRAWING

FIGS. 4A, 4B, 4C, 4C show construction of pixel section, image at the time of thinned-out readout, and at the time of partial region readout of regions "A" and "B", respectively, of the XY addressing type solid-state image pickup device shown in FIG. 3.

DESCRIPTION OF THE PREFERRED EMBODIMENTS

Figure 1:
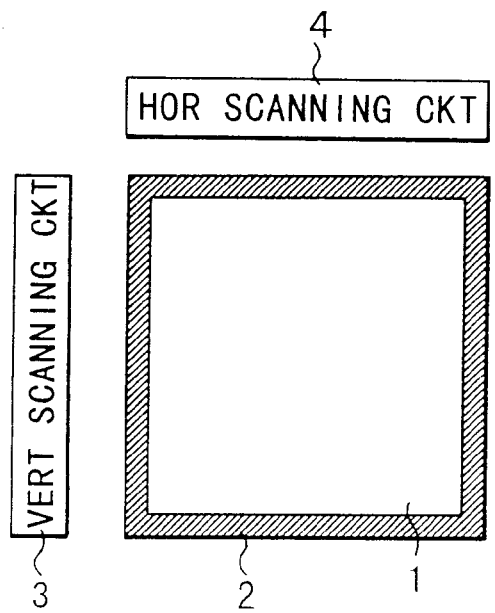
FIG. 1 is a schematic view of a construction of conventional XY addressing type image pickup device.
Figure 2A:
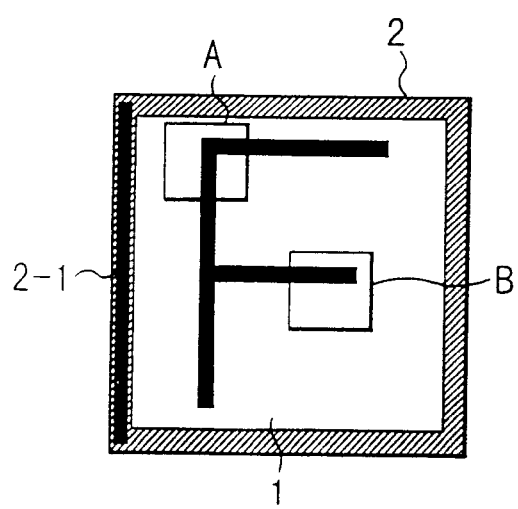
FIGS. 2A, 2B, 2C, 2D show construction of pixel section, image at the time of thinned-out readout, and at the time of partial region readout of regions "A" and "B", respectively, of the solid-state image pickup device shown in FIG. 1.
Figure 2B:
Figure 2C:
Figure 2D:
Figure 3:
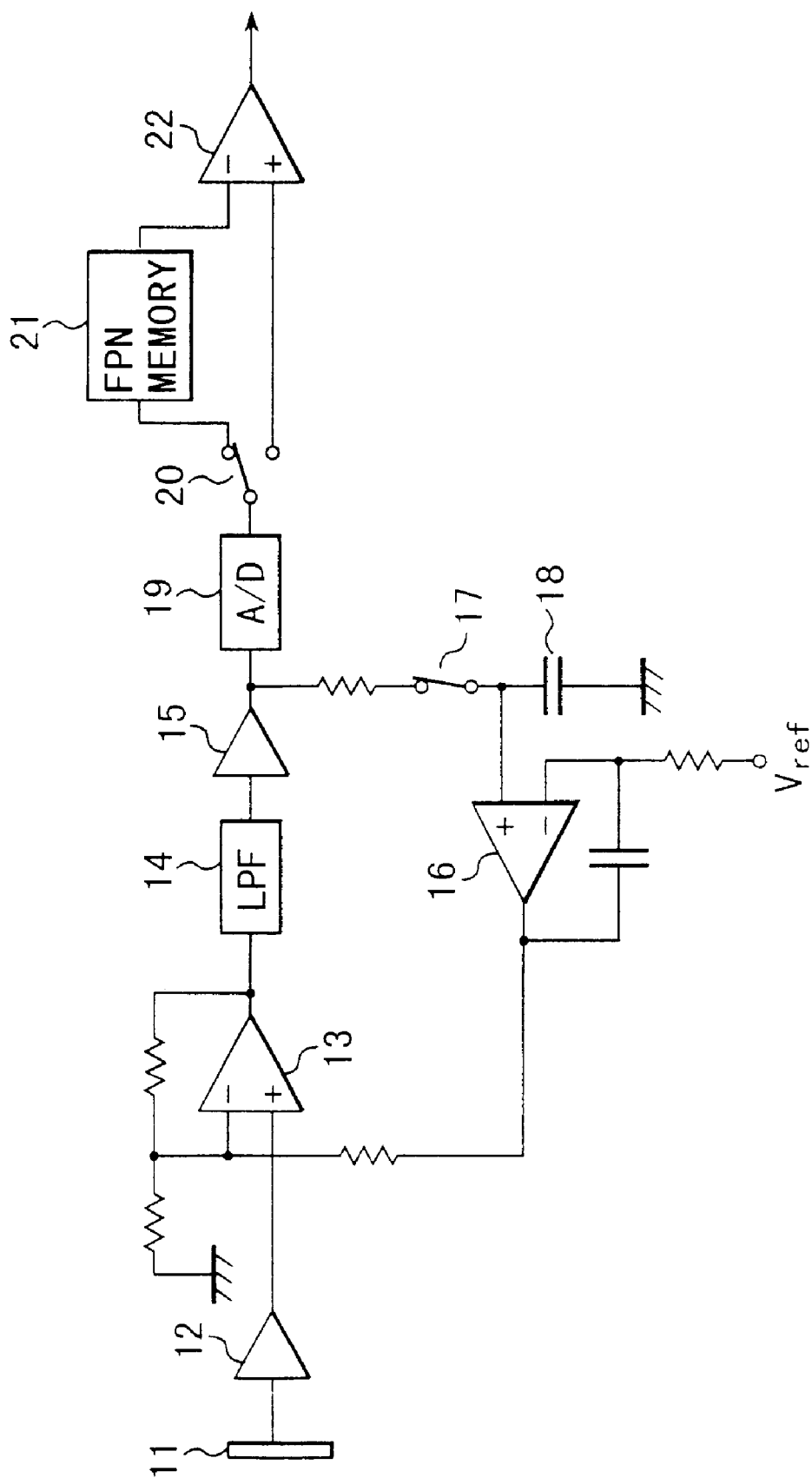
FIG. 3, is a block diagram showing a first embodiment of the image pickup apparatus according to the present invention.

An embodiment of the present invention will now be described. FIG. 3 is a block diagram showing a first embodiment of image pickup apparatus according to the present invention. Referring to FIG. 3: what is denoted by numeral 11 is an XY addressing type solid-state image pickup device; 12, a pre-amplifier for amplifying output signal of the solid-state image pickup device 11; 13, an operational amplifier; 14, a low-pass filter for limiting band of signal to be inputted to analog-to-digital converter; 15, driver of analog-to-digital converter; 16, an operational amplifier of a feedback OB clamp circuit. Denoted by numeral 17 is a switch to be turned ON at the time of reading out OB pixel so as to input OB pixel signal to one input terminal of the operational amplifier 16, and 18 is a hold capacitor for holding the OB pixel signal inputted to the operational amplifier 16, a reference level Vref being applied to the other input terminal of the operational amplifier 16. Denoted by numeral 19 is an analog-to-digital converter; 20, a changeover switch; 21, FPN memory into which FPN is written; 22, a subtractor.

FIG. 4A shows construction of pixel section of the above described XY addressing type solid-state image pickup device 11, where: 11-1, light receiving pixels; 11-2, optically shielded OB pixels disposed on the periphery of the light receiving pixels 11-1; and 11-3, OB pixels disposed at an upper left side of the light receiving pixels 11-1, i.e., constituting a part of a line located before the effective lines, indicating the OB pixels to be used in OB clamping. The pixel section of the image pickup device 11 in this embodiment has 2048 pixels arrayed both horizontally and vertically and comprises 4,200,000 pixels. Although its frame rate in performing a full-pixel readout is several frames per second by which a dynamic image cannot be picked up, it is capable of outputting a dynamic image with a standard video signal such as RS-170 when the entire picture area is read out as thinned out to ¼ both horizontally and vertically or when a partial region "A" or region "B" is read out. It should be noted that FIGS. 4B, 4C, 4D show image of thinned-out readout, readout of region "A" and region "B", respectively.

Further, in order to perform a stable OB clamping at 60 fields/sec, the time constant of OB clamp is set to several-hundred ms so that OB clamping is effected in a vertical blanking period by always using the clamping OB pixel 11-3 in a line before the effective lines.

Figure 5:
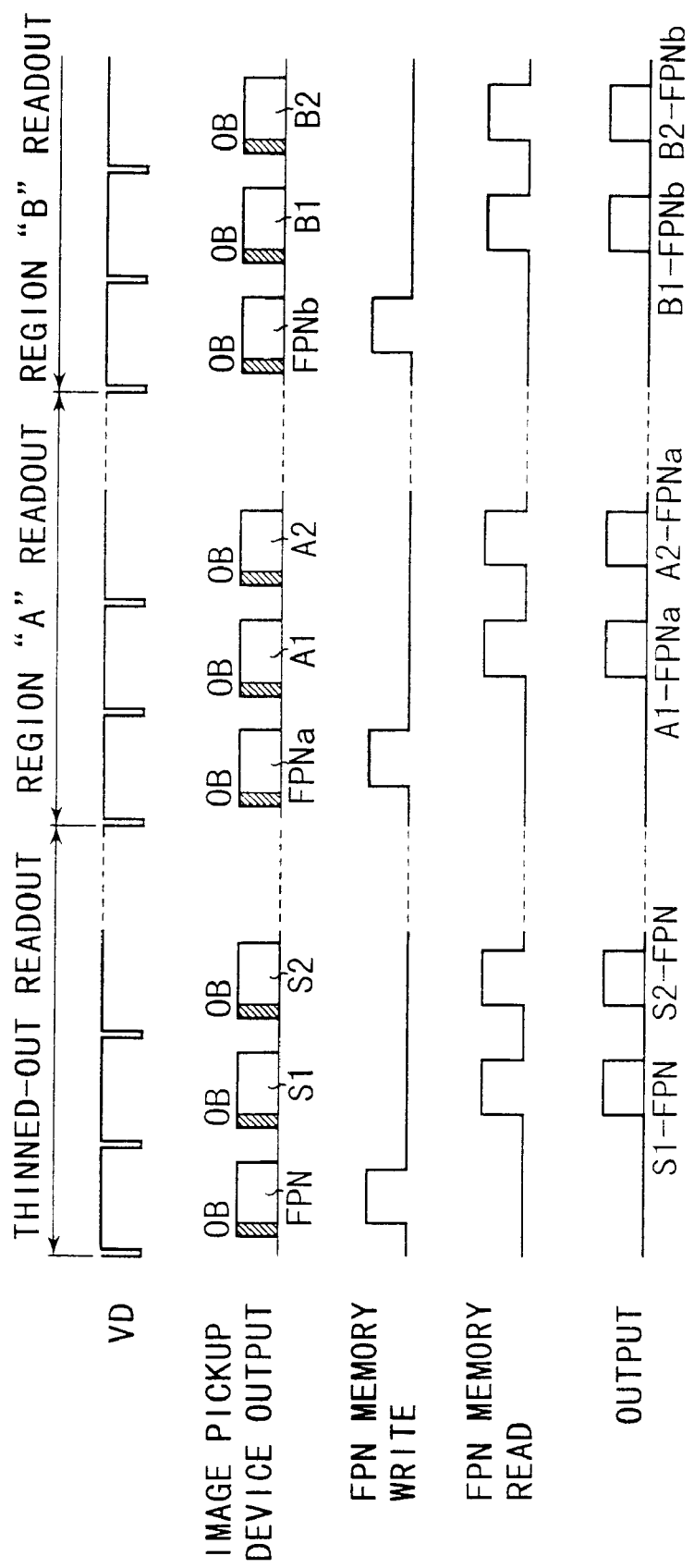
FIG. 5, is a timing chart for explaining operation of the first embodiment shown in FIG. 3.

Operation of image pickup apparatus having such construction will now be described with reference to a timing chart shown in FIG. 5. A case is shown in explaining an operation of this embodiment, where thinned-out readout is performed first, and, then, partial regional readout of region "A" and partial regional readout of region "B" are performed in that order. First, the solid-state image pickup device 11 is driven so that pixel signal immediately after reset be read out in the first one frame, thereby reading out signal of the clamping OB pixels 11-3 and FPN signal of the light receiving pixels 11-1. While the clamping OB pixel signal is being read out, the switch 17 is closed so as to cause an output of the driver 15 to be inputted to the holding capacitor 18 and operational amplifier 16 of a feedback circuit. The operational amplifier 16 is caused to output difference with respect to a reference level Vref as feedback to the operational amplifier 13, thereby the output of the driver 15 is clamped through feedback so as to be equalized to the reference level Vref.

Next, when FPN signal is read out from the light receiving pixels 11-1, it is written into FPN memory 21 through the changeover switch 20. For frames of the next and after, video signal as suppressed of FPN is outputted by subtracting the FPN written into FPN memory 21 from the video signals S1, S2 at the subtractor 22.

Next, when region to be read out is changed so as to read out region "A", the solid-state image pickup device is driven so that, similarly as before, signal immediately after reset is readout for the first one frame. Such signal is written into FPN memory as FPN signal FPNa, and, for frames of the next and after, video signal as suppressed of FPN is outputted by subtracting FPNa written into FPN memory from video signals A1, A2. At the time of readout of region "B", too, video signal as suppressed of FPN is outputted by similarly subtracting FPNb written into FPN memory from video signals B1, B2.

Since, in the present embodiment, OB clamping is effected by always using the same clamping OB pixels 11-3 as described above in any of thinned-out readout mode and partial regional readout mode of region "A" or region "B", it is possible to have equal OB pixel outputs. Accordingly, stable OB clamping is continuously effected even when region of signal to be read out has been changed for example from thinned-out readout to readout of region "A" or from readout of region "A" to readout of region "B". Further, since DC level of data of the first one frame written into memory as FPN is equal to that of video signal of frames of the next and after, video output after suppressing FPN is correctly outputted.

Figure 6:
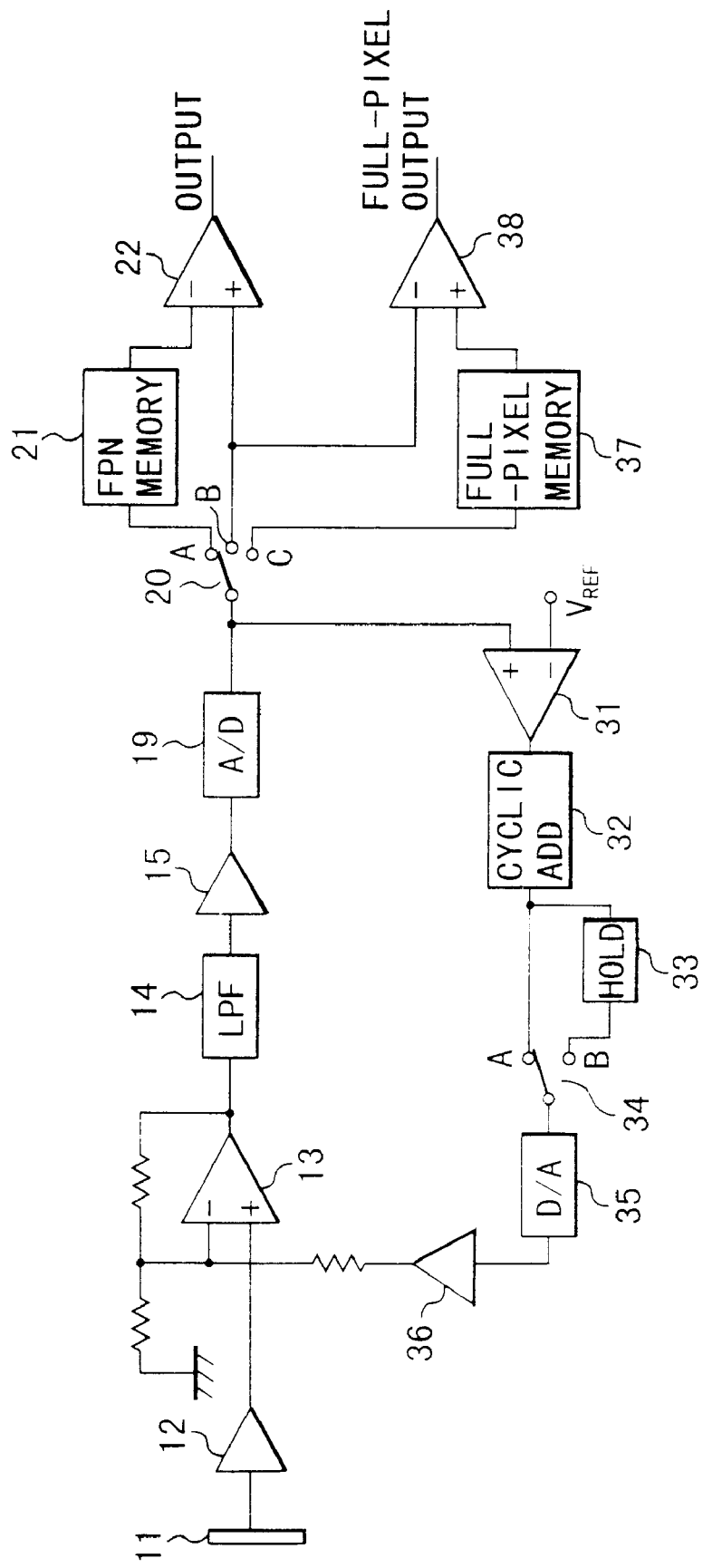
FIG. 6 is a block diagram showing a second embodiment of the present invention.

A second embodiment will now be described with reference to block diagram of FIG. 6. In FIG. 6, identical or corresponding members as those in the first embodiment shown in FIG. 3 are denoted by the same reference numerals and a description thereof will be omitted. Referring to FIG. 6: what is denoted by numeral 31 is a differential amplifier for outputting difference between the output of the analog-to-digital converter 19 and a reference level $V_{REF}$; 32, a cyclic adder having a function of low-pass filter for cyclically averaging the output of the differential amplifier 31 in field cycles; 33, a hold circuit for holding the output of the cyclic adder 32; 34, a changeover switch for switching between the outputs of the cyclic adder 32 and the hold circuit 33 to cause an output thereof; 35, a digital-to-analog converter; 36, a buffer amplifier of the digital-to-analog converter 35. Here, the circuit consisting of these components from a feedback circuit for providing feedback to the operational amplifier 13, where the portion from the differential amplifier 31 through the changeover switch 34, is a digital circuit and conversion into analog signal is effected at the digital-to-analog converter 35. Further, in FIG. 6, denoted by numeral 37 is a full-pixel memory into which image pickup data of all the pixels of the solid-state image pickup device 11 are written, and 38 is a subtractor. It should be noted that the XY addressing type image pickup device 11 is of the same construction as that used in the first embodiment.

Figure 7:
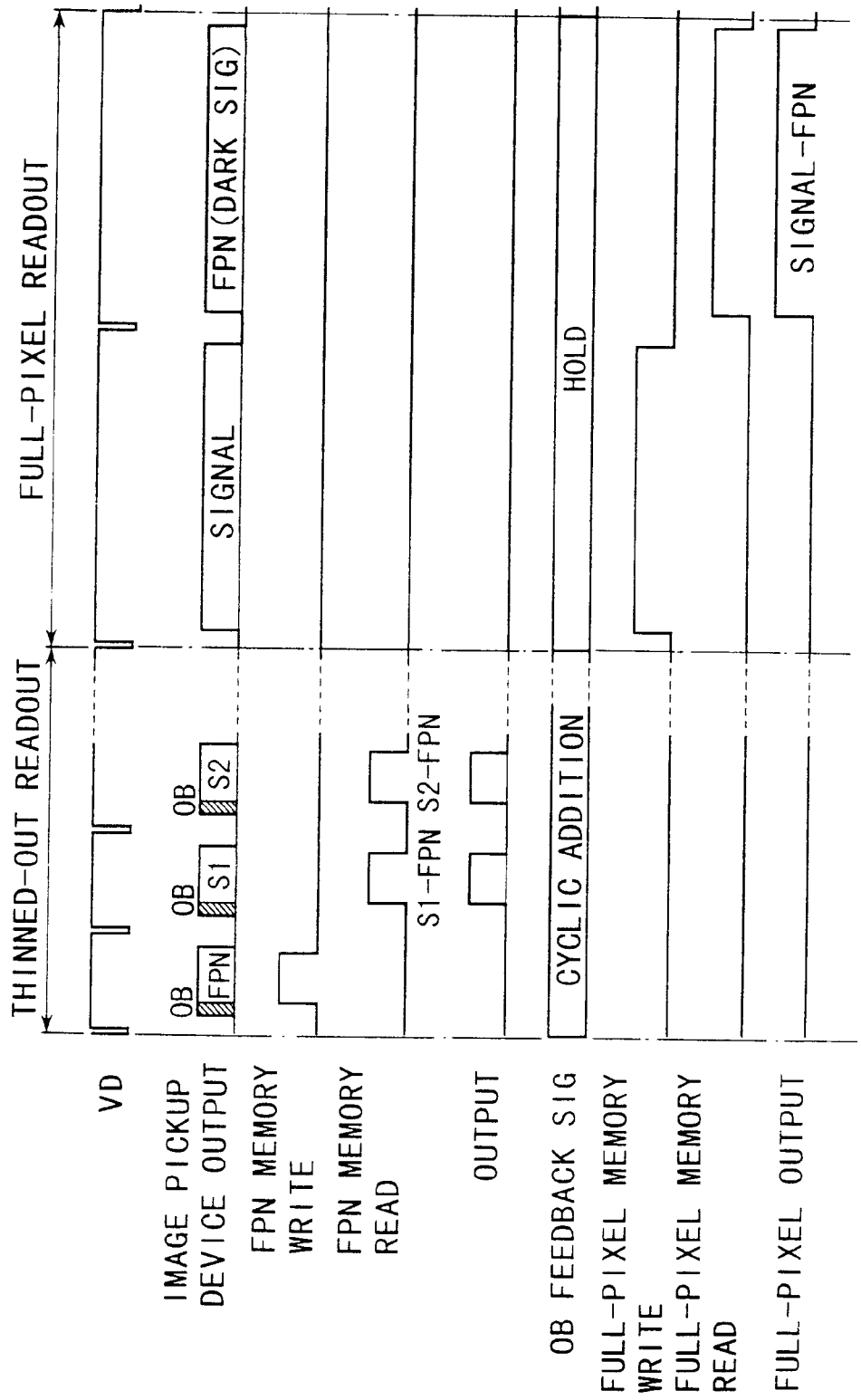
FIG. 7 is a timing chart for explaining operation of the second embodiment shown in FIG. 6.

Operation of the second embodiment thus constructed will now be described with reference to a timing chart shown in FIG. 7. In explaining the operation of the second embodiment, a description is given with respect to a case where thinned-out readout or readout of a given region is effected first (a case of thinned-out readout being shown as an exemplary case in FIG. 7) and then full-pixel readout is performed. First, in operation of mode for thinned-out readout or readout of a given region, the solid-state image pickup device 11 is driven so that pixel signal immediately after reset is read out for the first one frame, thereby reading out signal of the clamping OB pixels 11-3 and FPN signal of the light receiving pixels 11-1. The clamping OB pixel signal, after converted into digital signal at the analog-to-digital converter 19, is inputted to the differential amplifier 31 which is included in the feedback circuit. At the differential amplifier 31, difference between the output data of the analog-to-digital converter 19 and a reference level $V_{REF}$ is outputted, such difference being inputted to the cyclic adder 32 so as to be cyclically averaged at field cycles. The output thereof is inputted to the hold circuit 33 and at the same time inputted to the digital-to-analog converter 35 through the changeover switch 34 so as to be fed back to the operational amplifier 13 after a conversion into analog signal. The output data of the analog-to-digital converter 19 is thereby clamped through feedback so as to be always equal to the reference level $V_{REF}$.

The FPN signal read out from the light receiving pixels 11-1 is written into the FPN memory 21 through the changeover switch 20 which is connected to the side of "A".

For frames of the next and after, the changeover switch 20 is switched to the side of "B", and video signal as suppressed of FPN is outputted by subtracting the FPN signal written into FPN memory 21 from video signals Si, S2 at the subtractor 22. During this operation of thinned-out readout or operation of readout of a given region, the changeover switch 34 is connected to the side of "A" and the feedback clamp circuit is in operation. Stable clamping is effected, since the clamping OB pixels 11-3 to be read out are always the same even when the region of signal readout has been changed for example from thinned-out readout operation to readout operation of a given region.

In a transition from mode for thinned-out readout or readout of a given region to full-pixel readout mode, the changeover switch 34 is switched toward "B" and the changeover switch 20 is switched toward "C". The feedback data having been held at the hold circuit 33 when effecting thinned-out readout or readout of a given region is thereby converted into analog signal at the digital-to-analog converter 35 so as to be fed back to the operational amplifier 13. Here, when an image is to be picked up by performing full-pixel readout, exposure time is set by a shutter (not shown) and video signal of all the pixels is written into the full-pixel memory 37 by the first one frame. The changeover switch 20 is then switched toward "B" to read out signal of all the pixels when they are shielded from light by the shutter (dark signal: corresponding to FPN) so that a full-pixel video signal suppressed of FPN can be obtained by subtracting it from video signal read out from the full-pixel memory 37 at the subtractor 38.

By thus holding feedback signal at the time of stable OB clamping being effected in the readout operation before transition to readout of all the pixel signals and by feeding back the held feedback signal in transition to readout of all the pixel signals, a stable OB clamping and secure FPN suppressing operation are possible even in the mode for reading out all the pixel signals. Further, since video signal at the time of image pickup for reading out all the pixels is read out before FPN signal, it is possible to pick up an image with a smaller time lag.

The above embodiments have been described with respect to the manner for performing operation in mode of reading out a given region after the thinned-out readout mode or the manner of operation for effecting full-pixel readout mode after operation in mode for thinned-out readout or of reading out a given region. Using the feature of random access capabilities of XY addressing type solid-state image pickup device employed in the present invention, a real-time view angle (range of image to be picked up) adjustment and focusing can be performed of a high-definition image pickup device by switching, every other field or frame, between thinned-out readout and readout of a given region and by extracting and displaying both images. Here, in the case where the solid-state image pickup device is driven in this manner, too, a stable clamping is effected even after a change in signal readout mode or in location and/or number of the pixels to be read out, by always using the same OB pixels as shown in FIG. 4A for OB clamping. Further, in performing a full-pixel readout after the above described readout operation, a stable and secure OB clamping can be effected by using an OB clamp reference value which has been held as described above, and, if FPN suppression means is provided, it is possible to effect an accurate FPN suppressing operation.

As has been described by way of the above embodiments, it is possible in accordance with the present invention to effect a stable OB clamping even when signal readout mode has been changed or when location and/or number of the light receiving pixels to be read out have been changed. Further, in accordance with the present invention, since the number of pixels to be read out is set to the same so as to equalize signal accumulation time between readout of one pixel out of every given number of pixels and readout of the light receiving pixels in a given region, stable images can be always obtained as having equivalent brightness. Furthermore, in accordance with the present invention, a stable OB clamping with a reduced time lag can be effected even in a full-pixel readout mode such as at the time of taking one complete shot of picture.

What is claimed is:

1. An image pickup apparatus comprising,
    an XY addressing type solid-state image pickup device having light receiving pixels and optically shielded OB pixels on the periphery of the light receiving pixels, and
    drive means for driving the solid-state image pickup device in signal readout modes of a thinned-out readout mode for reading out one light receiving pixel out of every given number of pixels and a mode of reading out the light receiving pixels in a given partial region; and
    said image pickup apparatus further comprising;
        means for effecting OB clamping by always reading out the same number of OB pixels at the same locations, regardless of said two signal readout modes or regardless of location or number of light receiving pixels to be read out in said two signal readout modes.

2. The image pickup apparatus according to claim 1 further comprising fixed pattern noise suppression means for subtracting pixel signal immediately after reset in the first one frame read out by said drive means from video signal in frames of the next and after.

3. The image pickup apparatus according to claim 1, wherein the number of pixels to be read out in said mode for reading out one light receiving pixel out of every given number of pixels is set as the same as that in said mode of reading out the light receiving pixels in a given region.

4. The image pickup apparatus according to claim 2, wherein the number of pixels to be read out in said mode for reading out one light receiving pixel out of every given number of pixels is set as the same as that in said mode of reading out the light receiving pixels in a given direction.

5. An image pick up apparatus comprising,
    an XY addressing type solid-state image pickup device having light receiving pixels and optically shielded OB pixels on the periphery of the light receiving pixels, and
    drive means for driving the solid-state image pickup device, in addition to a mode for reading out all the pixels, in signal readout modes of a thinned-out readout mode for reading out one light receiving pixel out of every given number of pixels and a mode of reading out the light receiving pixels in a given region; and
    said image pickup apparatus further comprising means for effecting OB clamping by always reading out OB pixels at the same location and holding an OB claim reference value at the time of the OB clamping in said thinned-out readout mode for reading out one pixel out of every given number of pixels and in the mode of reading out a given region regardless of these two signal readout modes or regardless of location or number of light receiving pixels to be read out in the two signal readout modes, and effecting OB clamping in the mode for reading out all the pixels by using the OB clamp reference value having been held in said thinned-out readout mode for reading out one pixel out of every given number of pixels or the mode of reading out a given region.

6. The image pickup apparatus according to claim 5 further comprising fixed pattern noise suppression means for subtracting pixel signal immediately after reset in the first one frame read out by said drive means from video signal in frames of the next and after.

7. The image pickup apparatus according to claim 5, wherein the number of pixels to be read out in said mode for reading out one light receiving pixel out of every given number of pixels is set as the same as that in said mode of reading out the light receiving pixels in a given region.

8. The image pickup apparatus according to claim 6, wherein the number of pixels to be read out in said mode for reading out one light receiving pixel out of every given number of pixels is set as the same as that in said mode of reading out the light receiving pixels in a given region.

* * * * *